(12) United States Patent
Shimizu et al.

(10) Patent No.: US 8,792,752 B2
(45) Date of Patent: Jul. 29, 2014

(54) OPTICAL WAVEGUIDE ELEMENT MODULE

(75) Inventors: Ryo Shimizu, Chiyoda-ku (JP); Toru Sugamata, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 625 days.

(21) Appl. No.: 12/737,301

(22) PCT Filed: Jul. 3, 2009

(86) PCT No.: PCT/JP2009/062179
§ 371 (c)(1),
(2), (4) Date: Feb. 18, 2011

(87) PCT Pub. No.: WO2010/001986
PCT Pub. Date: Jan. 7, 2010

(65) Prior Publication Data
US 2011/0135241 A1 Jun. 9, 2011

(30) Foreign Application Priority Data

Jul. 4, 2008 (JP) ................................. 2008-175888

(51) Int. Cl.
*G02F 1/035* (2006.01)
*G02F 1/295* (2006.01)
*H03H 7/38* (2006.01)
*G02F 1/03* (2006.01)

(52) U.S. Cl.
USPC .......... 385/2; 385/8; 385/14; 385/40; 333/33; 333/34; 359/254

(58) Field of Classification Search
USPC .............. 385/1–9, 14, 40, 88, 92; 333/33, 34; 359/237, 239, 245, 248–249, 315
See application file for complete search history.

(56) References Cited

U.S. PATENT DOCUMENTS 5,200,719 A * 4/1993 Margulis et al. ............... 333/34
5,639,414 A * 6/1997 Unseld ........................ 264/402

(Continued)

FOREIGN PATENT DOCUMENTS

JP 6-289341 A 10/1994
JP 2003-140099 A 5/2003

(Continued)

*Primary Examiner* — Uyen Chau N Le
*Assistant Examiner* — Michael Mooney
(74) *Attorney, Agent, or Firm* — Taft Stettinius & Hollister LLP

(57) ABSTRACT

Provided is an optical waveguide element module which suppresses reflection of a modulation signal and attenuation of a modulation signal, even when an impedance of a modulation electrode of an optical waveguide element and an impedance of a transmission line for inputting the modulation signal from the external of the optical waveguide element are different from each other. The optical waveguide element module is provided with an optical waveguide element, which has a substrate (1) composed of a material having electro-optical effects, an optical waveguide (2) formed on the substrate, and a modulation electrode (3) which modules optical waves propagating in the optical waveguide; a connector (8), wherein an external signal line which inputs the modulation signal to the modulation electrode is connected to the modulation electrode; and a relay line which connects the connector and the modulation electrode and is formed on a relay substrate (7). Impedance of the relay line changes stepwise or continuously, and reflection of the modulation signal in the optical waveguide element module is suppressed.

6 Claims, 5 Drawing Sheets

(56) References Cited

U.S. PATENT DOCUMENTS

| | | | |
|---|---|---|---|
| 6,721,085 B2 * | 4/2004 | Sugiyama et al. | 359/322 |
| 6,741,378 B2 | 5/2004 | Sugiyama et al. | |
| 6,856,709 B2 | 2/2005 | Uesaka et al. | |
| 6,961,494 B2 * | 11/2005 | Tanaka | 385/40 |
| 7,133,578 B2 * | 11/2006 | Doi | 385/3 |
| 7,263,244 B2 | 8/2007 | Tanaka et al. | |
| 7,711,214 B2 * | 5/2010 | Tsuzuki et al. | 385/2 |
| 2003/0091258 A1 * | 5/2003 | Uesaka et al. | 385/2 |
| 2010/0027934 A1 | 2/2010 | Shimizu et al. | |
| 2010/0158428 A1 | 6/2010 | Kawano et al. | |

FOREIGN PATENT DOCUMENTS

| | | | |
|---|---|---|---|
| JP | 2003-233044 A | 8/2003 | |
| JP | 2004-318113 A | 11/2004 | |
| JP | 2004318113 | * 11/2004 | G02F 1/035 |
| JP | 2005-037547 A | 2/2005 | |
| JP | 2007-010942 A | 1/2007 | |
| JP | 2008-083449 A | 4/2008 | |
| WO | WO 2007/145144 A1 | 12/2007 | |

* cited by examiner

OPTICAL WAVEGUIDE ELEMENT MODULE

BACKGROUND OF THE INVENTION

1. Field of the Invention

The present invention relates to an optical waveguide element module, and more particularly, to an optical waveguide element module including a connector to which an external signal line for inputting a modulation signal to a modulation electrode of an optical waveguide element is connected and a relay line formed on a relay substrate so as to connect the connector to the modulation electrode.

2. Description of the Related Art

Hitherto, an optical waveguide element such as an optical modulator in which an optical waveguide is formed on a substrate having an electro-optical effect has been widely used as the means for controlling optical waves in the field of optical communications and optical measurements.

The optical waveguide element is provided with a modulation electrode modulating optical waves propagating in the optical waveguide and a modulation signal is input to the modulation electrode through a connector to which an external signal line is connected. Accordingly, in order to efficiently input the modulation signal to the modulation electrode from the external signal line, it is necessary to match the impedance of the modulation electrode with the impedance of the external signal line and to prevent reflection of the modulation signal in a transmission line.

FIG. 1 shows an example of an optical waveguide element module. The optical waveguide element includes a substrate 1 formed of a material having an electro-optical effect, an optical waveguide 2 formed in the substrate, and a modulation electrode 3 (in which the modulation electrode includes a signal electrode and a ground electrode but only the signal electrode is shown in FIG. 1 for the purpose of simplification) modulating optical waves propagating in the optical waveguide 2. An input optical fiber 4 for inputting the optical waves and an output optical fiber 5 for outputting the modulated optical waves are connected to the optical waveguide element. The optical waveguide element is air-tightly housed in a case 9 to form an optical waveguide element module. A modulation signal is applied to the modulation electrode 3 of the optical waveguide element through a connector 8 from a driver 6 disposed outside the optical waveguide element module.

The impedance from the driver 6 to the connector 8 is generally set to 50Ω. When the impedance of the modulation electrode of the optical waveguide element is 40Ω, the modulation signal is reflected from between the connector 8 and the modulation electrode 3 due to the impedance mismatch between the transmission lines as described above. In order to solve this problem, a relay substrate 7 is disposed between the connector 8 and the optical waveguide element, a resistor 11 (a 10Ω resistor in this case) is disposed in the relay substrate 7 as shown in FIG. 2, and the impedance closer to the optical waveguide element than the connector 8 is set to about 50Ω.

This method of adjusting the impedance is effective for suppressing the reflection of microwaves which are the modulation signal, but causes a problem in that the microwaves are attenuated by the resistor 11 and it is thus difficult to effectively apply the modulation signal to the optical waveguide element.

On the other hand, it has been proposed that the relay substrate 7 mounted with a filter circuit or the like is used to make the electro-optical conversion response characteristic of the optical waveguide element be a flat frequency characteristic from a low-frequency area to a high-frequency area as shown in FIG. 3 (see PTL 1).

PRIOR ART DOCUMENTS

Patent Literature

PTL 1: JP-A-2007-10942
PTL 2: JP-A-6-289341

FIG. 3 shows a high-pass filter in which a capacitor 12 and a resistor 13 are connected in parallel. The high-pass filter suppresses the electro-optical conversion response characteristic from being lowered in a high-frequency area by making it easy to pass the modulation signal of the high-frequency area through the high-pass filter.

However, when the impedance of the optical waveguide element, particularly, the modulation electrode 3, is different from the impedance of the signal line outside of the optical waveguide element module, the reflection of the modulation signal is caused as described above and the modulation signal is difficult to efficiently apply to the modulation electrode.

SUMMARY OF THE INVENTION

A goal of the invention is to solve the above-mentioned problems and to provide an optical waveguide element module which can suppress the reflection of a modulation signal and the attenuation of the modulation signal even when the impedance of a modulation electrode of the optical waveguide element is different from the impedance of a transmission line for inputting the modulation signal from the outside of the optical waveguide element.

To accomplish the above-mentioned goal, Aspect 1 of the invention provides an optical waveguide element module including: an optical waveguide element having a substrate formed of a material having an electro-optical effect, an optical waveguide formed on the substrate, and a modulation electrode modulating an optical wave propagating in the optical waveguide; a connector to which an external signal line for inputting a modulation signal to the modulation electrode is connected; and a relay line connecting the connector to the modulation electrode and being formed on a relay substrate, wherein impedance of the relay line varies stepwise or consecutively so as to suppress reflection of the modulation signal in the optical waveguide element module.

The "optical waveguide element module" in the invention means a module in which a relay line is connected to an optical waveguide element, and is not limited to the module in which the optical waveguide element is housed in a case 9, as shown in FIG. 1. The "relay line" is not limited to a simple signal line for transmitting a modulation signal, but may include a line having a circuit such as a filter circuit for adjusting the modulation signal.

Aspect 2 of the invention provides the optical waveguide element module according to Aspect 1, wherein the relay line is a coplanar line in which a signal electrode is interposed between ground electrodes.

Aspect 3 of the invention provides the optical waveguide element module according to Aspect 1 or 2, wherein the length of the relay line is a length which is not an integer times a quarter of the wavelength of a microwave as the modulation signal.

Aspect 4 of the invention provides the optical waveguide element module according to any one of Aspects 1 to 3, wherein the length of the relay line is less than half of the wavelength of a microwave as the modulation signal.

Aspect 5 of the invention provides the optical waveguide element module according to any one of Aspects 1 to 4, wherein the impedance of the relay line varies stepwise and the length of the relay line in blocks constituting the steps is less than a quarter of the wavelength of the microwave as the modulation signal.

Aspect 6 of the invention provides the optical waveguide element module according to any one of Aspects 2 to 5, wherein the relay line is adjusted so that gaps between the signal electrode and the ground electrodes decrease from the connector to the optical waveguide element.

Aspect 7 of the invention provides the optical waveguide element module according to any one of Aspects 1 to 6, wherein the dielectric constant of the material disposed around the relay line is adjusted so as to increase from the connector to the optical waveguide element.

According to Aspect 1 of the invention, since the optical waveguide element module includes: an optical waveguide element having a substrate formed of a material having an electro-optical effect, an optical waveguide formed on the substrate, and a modulation electrode modulating an optical wave propagating in the optical waveguide; a connector to which an external signal line for inputting a modulation signal to the modulation electrode is connected; and a relay line connecting the connector to the modulation electrode and being formed on a relay substrate, and the impedance of the relay line varies stepwise or consecutively so as to suppress reflection of the modulation signal in the optical waveguide element module, it is possible to efficiently apply the modulation signal to the modulation electrode and to suppress the attenuation of the modulation signal in the relay line.

According to Aspect 2 of the invention, since the relay line is a coplanar line in which a signal electrode is interposed between ground electrodes, it is possible to easily adjust the impedance of the relay line, for example, by adjusting the electrode gaps between the signal electrode and the ground electrodes. Accordingly, the number of components of the optical waveguide element module is not caused to increase and the production process is not complicated.

According to Aspect 3 of the invention, since the length of the relay line is a length which is not an integer times a quarter of the wavelength of a microwave as the modulation signal, it is possible to suppress a standing wave of a microwave from being generated in the relay line and thus to suppress the reflection of the modulation signal.

According to Aspect 4 of the invention, since the length of the relay line is less than a half of the wavelength of a microwave as the modulation signal, it is possible to suppress a standing wave of a microwave from being generated in the relay line and thus to suppress the reflection of the modulation signal.

According to Aspect 5 of the invention, since the impedance of the relay line varies stepwise and the length of the relay line in blocks constituting the steps is less than a quarter of the wavelength of a microwave as the modulation signal, it is possible to suppress a standing wave of a microwave from being generated in the blocks constituting the steps and thus to suppress the reflection of the modulation signal.

According to Aspect 6 of the invention, since the relay line is adjusted so that gaps between the signal electrode and the ground electrodes decrease from the connector to the optical waveguide element, the number of components of the optical waveguide element module is not caused to increase at the time of adjusting the impedance and the production process is not complicated.

According to Aspect 7, since the dielectric constant of the material disposed around the relay line is adjusted so as to increase from the connector to the optical waveguide element, it is possible to change the impedance stepwise or consecutively, for example, without changing the shape and arrangement of the signal electrode or the ground electrodes greatly.

DETAILED DESCRIPTION OF THE INVENTION

Hereinafter, the invention will be described in detail with reference to exemplary embodiments.

The invention provides an optical waveguide element module including: an optical waveguide element having a substrate formed of a material having an electro-optical effect, an optical waveguide formed on the substrate, and a modulation electrode modulating an optical wave propagating in the optical waveguide; a connector to which an external signal line for inputting a modulation signal to the modulation electrode is connected; and a relay line connecting the connector to the modulation electrode and being formed on a relay substrate, wherein impedance of the relay line varies stepwise or consecutively so as to suppress reflection of the modulation signal in the optical waveguide element module.

Figure 1:
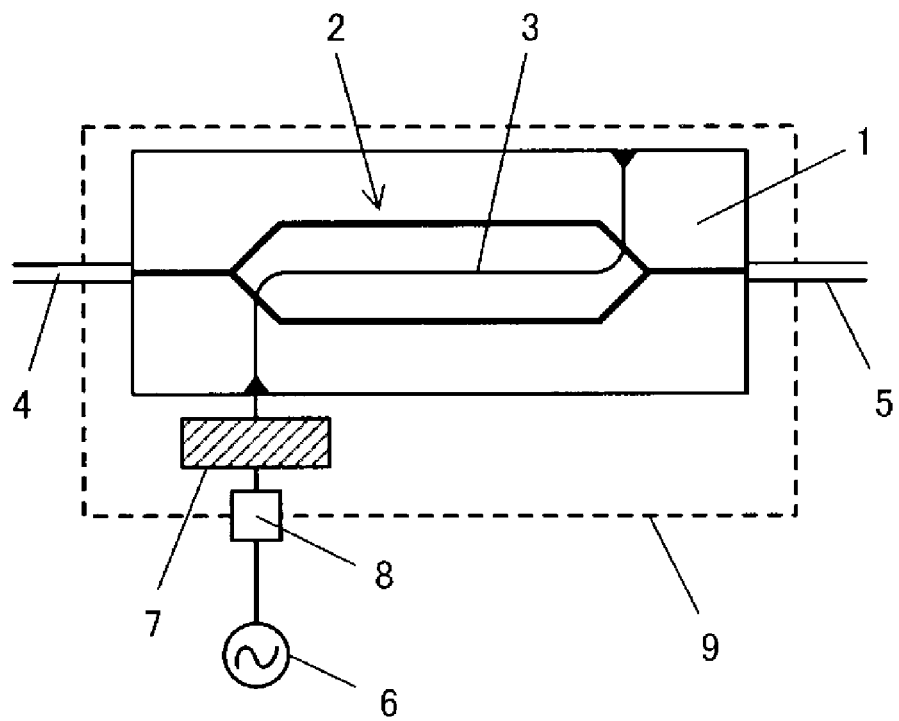
FIG. 1 is a schematic diagram illustrating an optical waveguide element module.
Figure 2:
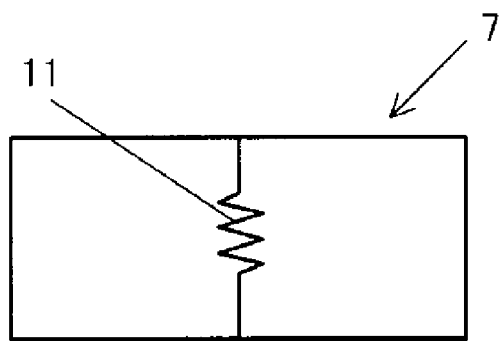
FIG. 2 is a diagram illustrating an example where a resistor is disposed in a relay substrate.
Figure 3:
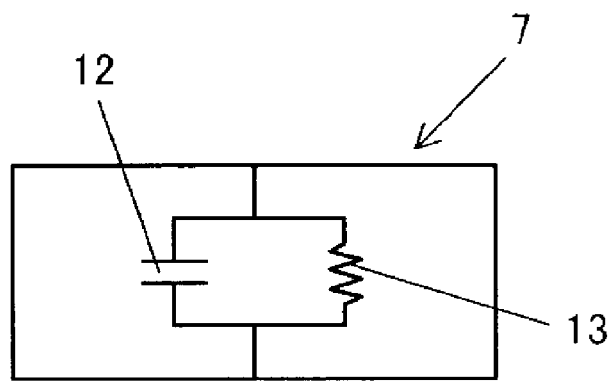
FIG. 3 is a diagram illustrating an example where a filter circuit is disposed in the relay substrate.

The optical waveguide element module according to the invention is not different in basic structure from the known optical waveguide element module shown in FIG. 1, except that the impedance of the relay line formed on the relay substrate 7 is adjusted. Accordingly, without greatly changing the production process, it is possible to suppress the reflection or attenuation of the modulation signal and to efficiently apply the modulation signal to the modulation electrode.

The optical waveguide element to which the invention is applied will be described.

A substrate 1 is a substrate having an electro-optical effect and is formed of a material such as lithium niobate, lithium tantalite, PLZT (Lead Lanthanum Zirconate Titanate), and quartz. Specifically, the substrate is formed of an X-cut plate, a Y-cut plate, or a Z-cut plate of a monocrystalline material. Lithium niobate (LN) is preferably used because it can easily form an optical waveguide device and has an excellent anisotropic property.

An optical waveguide 2 is a so-called Mach-Zehnder type optical waveguide, and can be formed on the substrate 1 by diffusing, for example, titanium (Ti) onto the surface of the substrate using a thermal diffusion method or a proton exchange method. In another method, a ridge structure may be formed on a portion corresponding to an optical waveguide to form the optical waveguide, as described in PTL 2. The method using Ti may be used together with the ridge structure.

To modulate an optical wave propagating in the optical waveguide 2, a modulation electrode is disposed above or around the optical waveguide 2 as needed.

The modulation electrode can be formed on the top surface or the bottom surface of the substrate 1 through the formation of Ti and Au electrode patterns and gold plating or the like. The modulation electrode includes a signal electrode 3 transmitting a modulation signal (an AC signal or a DC signal) and ground electrodes disposed around the signal electrode.

Although not particularly shown, a buffer layer of $SiO_2$ or the like may be formed between the substrate 1 and the modulation electrode. Accordingly, it is possible to effectively prevent the optical wave propagating in the optical waveguide from being absorbed or scattered by the modulation electrode. The buffer layer contributes to the matching of speed between the modulation signal applied from the modulation electrode and the optical wave propagating in the optical waveguide.

Figure 4:
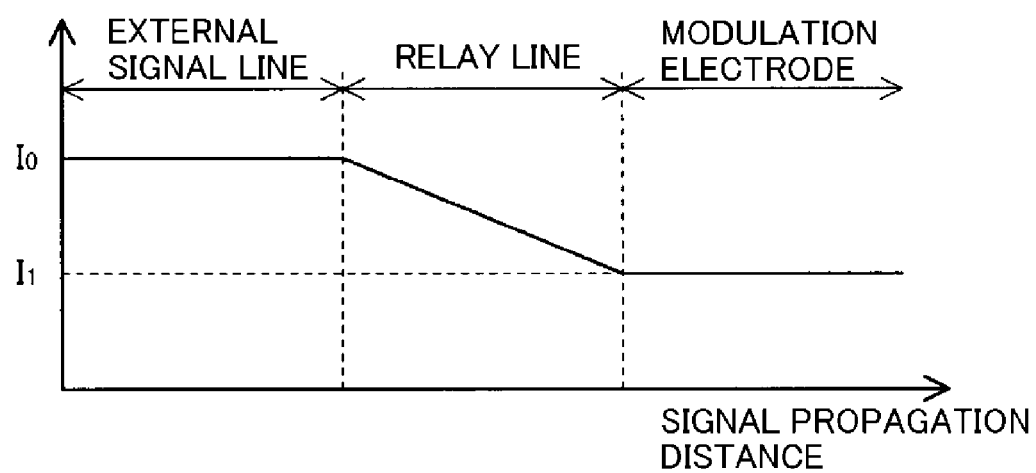
FIG. 4 is a diagram illustrating a variation in impedance in a relay line and portions before and after the relay line.

In the optical waveguide element module according to the invention, the impedance of a relay line formed on a relay substrate is adjusted consecutively or stepwise as shown in FIG. 4, thereby suppressing the reflection of the modulation signal due to the mismatch between the impedance $I_0$ of an external signal line and the impedance $I_1$ of the modulation electrode. The external signal line means a transmission line from the connector 8 to the driver 6 in FIG. 1, and the relay line means a transmission line formed on the relay substrate 7 in FIG. 1.

Figure 5:
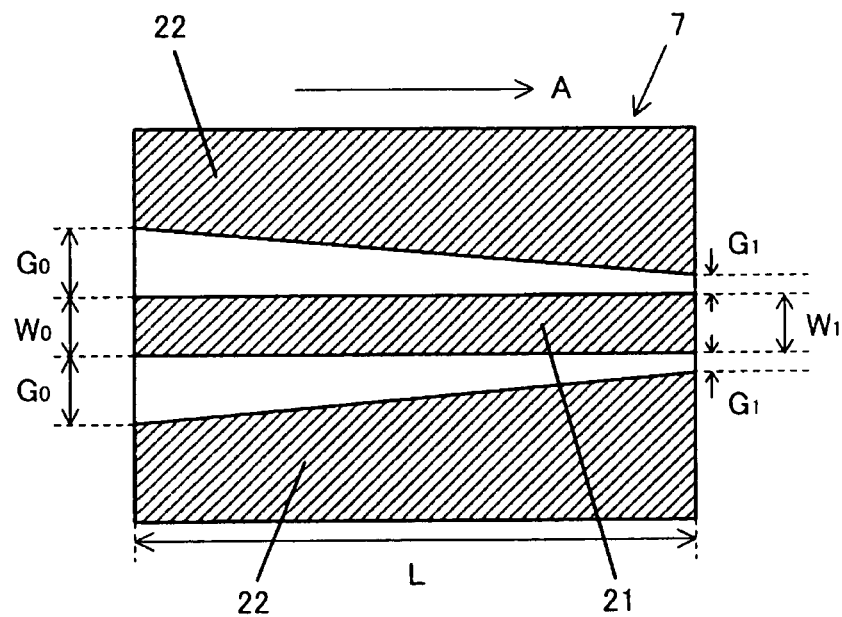
FIG. 5 is a diagram illustrating a relay substrate according to a first embodiment of the invention.
Figure 6:
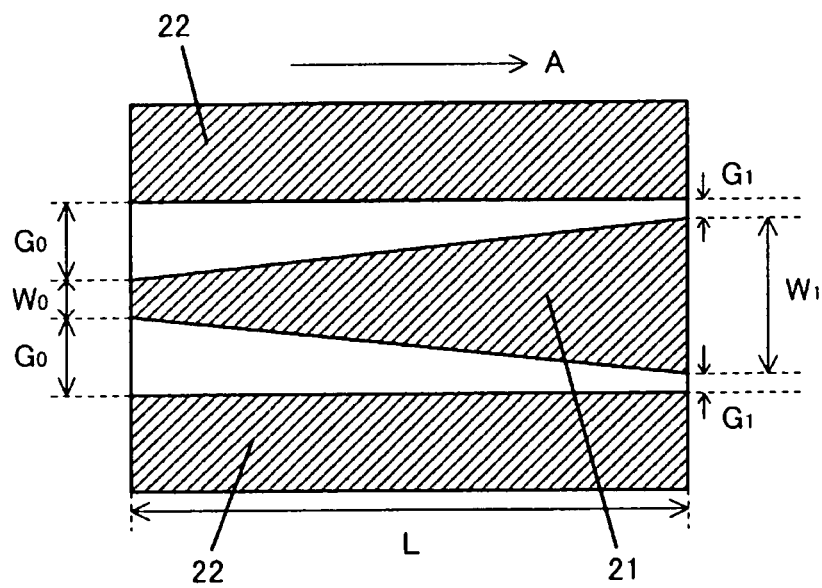
FIG. 6 is a diagram illustrating a relay substrate according to a second embodiment of the invention.
Figure 7:
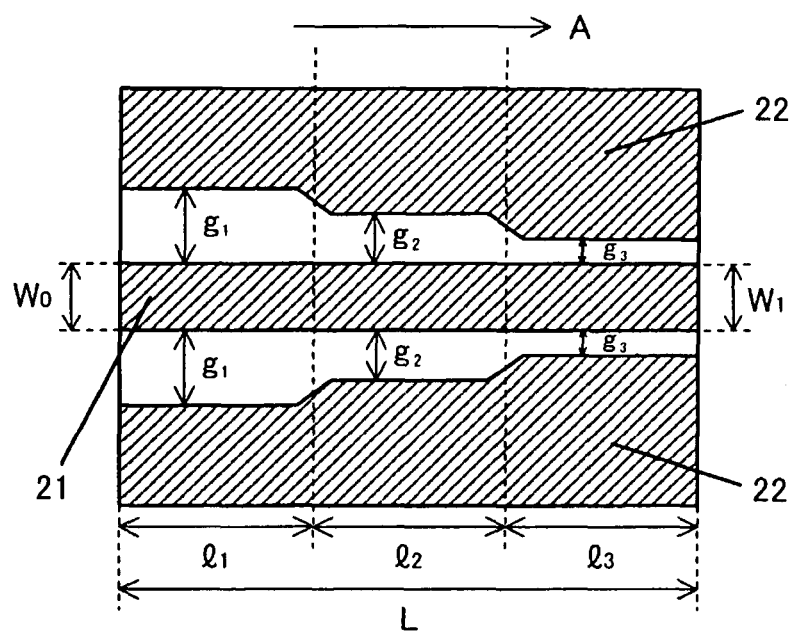
FIG. 7 is a diagram illustrating a relay substrate according to a third embodiment of the invention.

As shown in FIGS. 5 to 7, a method of forming the relay line out of a coplanar electrode including the signal electrode 21 and the ground electrodes 22 and consecutively or stepwise changing the electrode gaps between the signal electrode 21 and the ground electrodes 22 can be used as a method of adjusting the impedance of the relay line.

In FIG. 5, the input-side width $W_0$ and the output-side width $W_1$ of the signal electrode 21 are set to the same width and the output-side electrode gap $G_1$ is set to become smaller than the input-side electrode gap $G_0$. Arrow A represents the propagation direction of the modulation signal.

In FIG. 6, the gap between two ground electrodes 22 is set to be constant and the output-side width $W_1$ of the signal electrode 21 is set to become greater than the input-side width $W_0$. As a result, the output-side electrode gap $G_1$ is smaller than the input-side electrode gap $G_0$. By combining the configurations shown in FIGS. 5 and 6, the gap between two ground electrodes 22 may be set to slowly decrease as shown in FIG. 5 and the width of the signal electrode 21 may be set to slowly increase as shown in FIG. 6.

When a microwave as the modulation signal forms a standing wave in the relay line, the possibility of reflection of the microwave in the relay line increases. To avoid this reflection, the length L of the relay line is set to a length which is not an integer times a quarter of the wavelength of the microwave as the modulation signal or a length less than a half of the wavelength of the microwave, whereby it is possible to suppress the standing wave of the microwave from being formed in the relay line.

As shown in FIG. 7, the impedance of the relay line may be set to vary stepwise. In FIG. 7, the input-side width $W_0$ and the output-side width $W_1$ of the signal electrode 21 are set to the same width and the electrode gaps ($g_1$ to $g_3$) between the signal electrode 21 and the ground electrodes 22 are set to decrease stepwise from the input side to the output side. In FIG. 7, the width of the signal electrode is set to be constant, but a shape in which the width of the signal electrode varies consecutively or increases stepwise as shown in FIG. 6 may be employed.

When the impedance varies stepwise as shown in FIG. 7, the lengths ($l_1$ to $l_3$) of the relay line in the blocks constituting the steps can be set to a length less than a quarter of the wavelength of the microwave as the modulation signal. Accordingly, it is possible to suppress the standing wave of the microwave from being formed in the relay lines of the blocks constituting the steps and thus to suppress the reflection of the modulation signal.

Figure 8A:
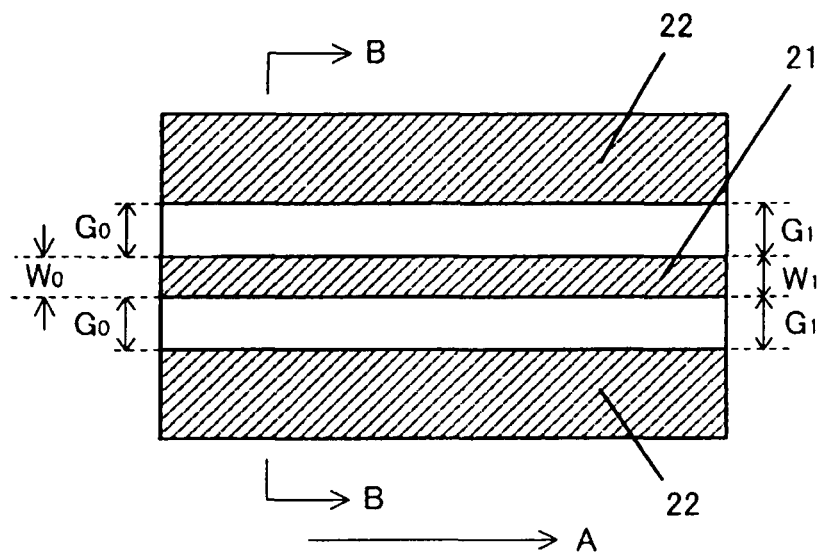
FIGS. 8A and 8B are diagrams illustrating a relay substrate according to a fourth embodiment of the invention.
Figure 8B:
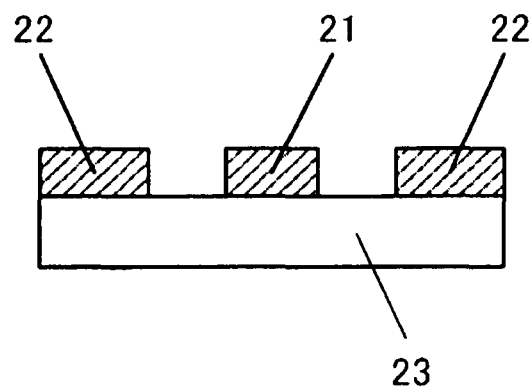

To change the impedance of the relay line, as shown in FIG. 8A, the width ($W_0$ and $W_1$) of the signal electrode 21 or the gaps ($G_0$ and $G_1$) between the signal electrode 21 and the ground electrodes 22 may be set to be constant and the dielectric constant of the material disposed around the relay line may be adjusted to increase from the connector to the optical waveguide element. Specifically, the dielectric constant may be set to vary by changing stepwise the material of a base plate 23 of the relay substrate or the like as shown in FIG. 8B which is a sectional view taken along arrow B of FIG. 8A, or a dielectric body may be disposed in such a shape so as to cover between the signal electrode 21 and the ground electrodes and a part of the signal electrode 21 and the ground electrodes and films having different dielectric constants may be formed stepwise along the signal electrode so as to adjust the dielectric constant although not shown.

The embodiments shown in FIGS. 5 to 7 and FIGS. 8A and 8B describe only the method of adjusting the impedance of the relay line, but the filter circuit described in PTL 1 may be disposed on the relay line by combination therewith.

It is shown in FIGS. 4 to 7 and FIGS. 8A and 8B that the impedance of the relay line decreases stepwise or consecutively toward the optical waveguide element. On the contrary, when the impedance of the modulation electrode of the optical waveguide element is higher than the impedance of the external signal line, the impedance of the relay line may be set to increase toward the optical waveguide element.

As described above, the invention can provide an optical waveguide element module which can suppress the reflection of the modulation signal and the attenuation of the modulation signal even when the impedance of the modulation electrode of the optical waveguide element is different from the impedance of the transmission line for inputting the modulation signal from the outside of the optical waveguide element.

REFERENCE SIGNS LIST

1: SUBSTRATE
2: OPTICAL WAVEGUIDE
3: MODULATION ELECTRODE
4: INPUT OPTICAL FIBER
5: OUTPUT OPTICAL FIBER
6: DRIVER
7: RELAY SUBSTRATE
8: CONNECTOR
9: CASE
10 and 13: RESISTOR
12: CAPACITOR
11: ELECTRIC RESISTANCE (FILM RESISTANCE)
21: SIGNAL ELECTRODE
22: GROUND ELECTRODE
23: BASE PLATE

What is claimed is:

1. An optical waveguide element module comprising:
an optical waveguide element having a substrate formed of a material having an electro-optical effect, an optical waveguide formed on the substrate, and a modulation electrode modulating an optical wave propagating in the optical waveguide;

a connector to which an external signal line for inputting a modulation signal to the modulation electrode is connected; and a relay line connecting the connector to the modulation electrode and being formed on a relay substrate, wherein impedance of the relay line decreases stepwise, and a length of the relay line in blocks constituting the steps is less than a quarter of a wavelength of a microwave used as the modulation signal.

2. The optical waveguide element module according to claim 1, wherein the relay line is a coplanar line in which a signal electrode is interposed between ground electrodes.

3. The optical waveguide element module according to claim 1, wherein a length of the relay line is a length which is not an integer times a quarter of a wavelength of a microwave used as the modulation signal.

4. The optical waveguide element module according to claim 1, wherein a length of the relay line is less than a half of a wavelength of a microwave used as the modulation signal.

5. The optical waveguide element module according to claim 1, wherein the relay line is adjusted so that gaps between the signal electrode and the ground electrodes decrease from the connector to the optical waveguide element.

6. The optical waveguide element module according to claim 1, wherein a dielectric constant of a material disposed around the relay line is adjusted so as to increase from the connector to the optical waveguide element.

* * * * *